US010767290B2

(12) United States Patent
Marissen et al.

(10) Patent No.: US 10,767,290 B2
(45) Date of Patent: Sep. 8, 2020

(54) TAPE AND PRODUCTS CONTAINING THE SAME

(75) Inventors: Roelof Marissen, Born (NL); Koen van Putten, Hoensbroek (NL); Antoon Maria Verspagen, Landgraaf (NL)

(73) Assignee: DSM IP ASSETS B.V., Heerlen (NL)

(*) Notice: Subject to any disclaimer, the term of this patent is extended or adjusted under 35 U.S.C. 154(b) by 233 days.

(21) Appl. No.: 13/993,854

(22) PCT Filed: Dec. 13, 2011

(86) PCT No.: PCT/EP2011/072645
§ 371 (c)(1),
(2), (4) Date: Aug. 28, 2013

(87) PCT Pub. No.: WO2012/080274
PCT Pub. Date: Jun. 21, 2012

(65) Prior Publication Data
US 2013/0337235 A1    Dec. 19, 2013

(30) Foreign Application Priority Data

Dec. 14, 2010   (EP) .................................... 10194966

(51) Int. Cl.
| | |
|---|---|
| *D04H 3/04* | (2012.01) |
| *B32B 5/12* | (2006.01) |
| *D04H 3/14* | (2012.01) |
| *F41H 5/04* | (2006.01) |
| *B32B 5/26* | (2006.01) |

(52) U.S. Cl.
CPC ................. *D04H 3/04* (2013.01); *B32B 5/12* (2013.01); *B32B 5/26* (2013.01); *D04H 3/14* (2013.01); *F41H 5/0485* (2013.01); *B32B 2250/05* (2013.01); *B32B 2250/20* (2013.01); *B32B 2262/0253* (2013.01); *B32B 2307/54* (2013.01); *Y10T 428/24479* (2015.01); *Y10T 428/24612* (2015.01)

(58) Field of Classification Search
CPC ................. Y10T 428/24479; Y10T 428/24612
USPC ........................................................ 442/243
See application file for complete search history.

(56) References Cited

U.S. PATENT DOCUMENTS

| | | | |
|---|---|---|---|
| 3,526,565 A | 9/1970 | Walter | |
| 4,233,350 A | 11/1980 | Shiflet | |
| 4,615,853 A * | 10/1986 | Aoyama ................. | B29C 43/22 264/104 |
| 5,149,391 A * | 9/1992 | Li ........................... | B29C 70/50 100/153 |
| 2004/0092183 A1* | 5/2004 | Geva ......................... | B32B 5/02 442/134 |
| 2006/0258995 A1* | 11/2006 | Pendharkar ............. | A61L 27/18 604/307 |
| 2007/0071941 A1 | 3/2007 | Eleazer et al. | |
| 2010/0260968 A1* | 10/2010 | Marissen .............. | F41H 5/0478 428/114 |
| 2011/0036235 A1* | 2/2011 | Hoefnagels et al. ........ | 89/36.02 |

FOREIGN PATENT DOCUMENTS

| | | | | |
|---|---|---|---|---|
| DE | 197 07 125 | | 6/1998 | |
| EP | 0 344 318 | | 12/1989 | |
| GB | 1 057 444 | | 2/1967 | |
| WO | WO 2009/056286 | | 5/2009 | |
| WO | WO-2009056286 A1 * | | 5/2009 | ........... F41H 5/0478 |

OTHER PUBLICATIONS

International Search Report for PCT/EP2011/072645, dated Feb. 8, 2012.

* cited by examiner

*Primary Examiner* — Frank J Vineis
*Assistant Examiner* — Laura B Figg
(74) *Attorney, Agent, or Firm* — Nixon & Vanderhye P.C.

(57) ABSTRACT

The invention relates to a fibrous tape comprising fused polymeric fibers, said fibrous tape having a tape thickness and a tape width and being characterized by a coefficient of variation (CV) of the tape thickness across the tape width of at most 6%.

19 Claims, No Drawings

TAPE AND PRODUCTS CONTAINING THE SAME

This application is the U.S. national phase of International Application No. PCT/EP2011/072645, filed 13 Dec. 2011, which designated the U.S. and claims priority to EP Application No. 10194966.7, filed 14 Dec. 2010, the entire contents of each of which are hereby incorporated by reference.

The invention relates to a fibrous tape comprising polymeric fibers fused together. The invention also relates to a process for manufacturing the tape and to various products containing the tape.

Fibrous tapes comprising polymeric fibers fused together are known for example from WO 2009/0056286, wherein a tape prepared by aligning fibers in a unidirectional fashion and mechanically fusing the adjacent fibers is disclosed. The mechanical fusing of adjacent fibers is carried out by spreading the fibers, such that there is at least some overlap between adjacent fibers, and compressing the fibers at high pressure and below the melting temperature of the fibers. In the examples of WO 2009/0056286 multilayered sheet are made by winding filaments around a receiving plate, rotating the receiving plate and winding a consecutive layer of fibers, such that the fiber direction in a consecutive layer is at an angle of 90 degrees to the fiber direction in a previous layer. The fibers in the multilayered structure are then mechanically fused by inserting the receiving plate wound with several layers of filaments in a hydraulic press.

Although the fibrous tapes produced according to WO 2009/0056286 are high quality tapes and relatively flat, the properties of these tapes can be even further improved. In particular it was observed that the thickness of the tapes produced according to WO 2009/0056286 shows thickness variations across the tape width and that these thickness variations may deleteriously affect the performance of the tapes.

An aim of the invention may therefore be to produce a fibrous tape having a length and a thickness, the thickness of said tape presenting fewer variations across the tape's width.

The invention provides a fibrous tape comprising fused polymeric fibers, said fibrous tape having a tape thickness and a tape width and being characterized by a coefficient of variation (CV) of the tape thickness across the tape width of at most 6%.

It was observed that the thickness of the fibrous tape of the invention shows fewer variations along the tape's width. It was also observed that the performance of the tapes of the invention in various articles comprising thereof might be improved. In particular it was observed that the tapes of the invention may have an increased performance when used in antiballistic products when compared with known fibrous tapes.

Preferably, the CV of the tape thickness of the tapes of the invention is at most 5%, more preferably at most 4%, even more preferably at most 3%, most preferably at most 2%. To inventors' knowledge, fibrous tapes having such a low CV were never produced hitherto.

By the term "fibrous tape" is herein understood a tape obtained by process wherein polymeric fibers are used as a precursor material. A fibrous tape is structurally different than a non-fibrous tape, which is usually obtained by compressing polymeric powders or spinning solutions or melts of polymeric powders, in that when a cross-section of a fibrous tape is observed with a microscope, boundaries of the precursor fibers fused into the tape can be identified.

By the term "fibrous tape comprising fused polymeric fibers" is herein understood a tape comprising abutting polymeric fibers each polymeric fiber having a fiber length, wherein the abutting polymeric fibers are fused to each other over an abutting length. Preferably, the abutting length is at least 50% of the fibers' length, more preferably at least 70%, most preferably at least 90%. More preferably, the abutting length of the polymeric fibers is about the same with the fibers' length. The abutting length over which abutting polymeric fibers are fused to each other is a measure of the degree of fibers' fusion. The degree of fiber's fusion may be adjusted as it will be detailed hereinafter and the abutting length may be measured with a microscope preferably provided with an adjustable depth of field and/or with a contrast enhancer device. The difference between two (at least partially) fused fibers and two non-fused fibers is that the fused fibers are hindered in moving one in respect to each other over the fused part which keeps the fibers in intimate contact.

By tape is herein understood an elongated body having a width and a thickness and a cross sectional aspect ratio, i.e. the ratio of width to thickness, of preferably at least 5:1, more preferably at least 20:1, even more preferably at least 100:1 and yet even more preferably at least 1000:1. The width of the fibrous tape is preferably between 1 mm and 2000 mm, more preferable between 10 mm and 1800 mm, even more preferably between 30 mm and 1600 mm, yet even more preferably between 50 mm and 1400 mm and most preferably between 70 mm and 1200 mm. The fibrous tape preferably has a thickness of between 1 µm and 200 µm and more preferably of between 5 µm and 100 µm. By width is herein understood the largest dimension between two points on the perimeter of a cross-section of the tape, said cross-section being perpendicular on the length of the tape. By thickness is herein understood a distance between two points on the perimeter of said cross-section, said distance being perpendicular on the width of the tape. The width and the thickness of a tape can be measured according to known methods in the art, e.g. with the help of a ruler and a microscope or a micrometer, respectively.

By fiber is herein understood an elongated body having a length much greater that its transverse dimensions. A fiber may have a regular rounded cross-section, e.g. oval or circular; or an irregular cross-section, e.g. lobed, C-shaped or U-shaped. The fibers may have continuous lengths, known in the art as filaments, or discontinuous lengths, known in the art as staple fibers. Staple fibers are commonly obtained by cutting or stretch-breaking filaments. A yarn for the purpose of the invention is an elongated body containing many fibers. Preferably, the fiber has a cross sectional aspect ratio, the ratio of the largest dimension between two points on the perimeter of a cross-section of the fiber and the lowest dimension between two points on the same perimeter of less than 5:1, more preferably of at most 3:1.

Examples of polymeric fibers suitable for the present invention include but are not limited to fibers manufactured from polyamides and polyaramides, e.g. poly(p-phenyleneterephthalamide) (known as Kevlar®); poly(tetrafluoroethylene) (PTFE); poly{2,6-diimidazo-[4,5b-4',5'e]pyridinylene-1,4(2,5-dihydroxy)phenylene} (known as M5); poly(p-phenylene-2, 6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly(butyleneterephthalate), and poly(1,4 cyclohexylidenedimethyleneterephthalate); polyvinyl alcohols; thermotropic liquid crystal polymers (LCP) as known from e.g. U.S. Pat. No.

4,384,016; polyolefins e.g. homopolymers and copolymers of polyethylene and/or polypropylene; and combinations thereof.

Good results may be obtained when the polymeric fibers are polyolefin fibers, more preferably polyethylene fibers. Preferred polyethylene fibers are high and ultrahigh molecular weight polyethylene ([U]HMWPE) fibers. Polyethylene fibers may be manufactured by any technique known in the art, preferably by a melt or a gel spinning process. Most preferred fibers are gel spun UHMWPE fibers, e.g. those sold by DSM Dyneema, NL under the name Dyneema®. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "Advanced Fiber Spinning Technology", Ed. T. Nakajima, Woodhead Publ. Ltd (1994), ISBN 185573 182 7.

The tensile strength of the polymeric fibers is preferably at least 1.2 GPa, more preferably at least 2.5 GPa, most preferably at least 3.5 GPa. The tensile modulus of the polymeric fibers is preferably at least 5 GPa, more preferably at least 15 GPa, most preferably at least 25 GPa. Best results were obtained when the polymeric fibers were UHMWPE fibers having a tensile strength of at least 2 GPa, more preferably at least 3 GPa and a tensile modulus of preferably at least 50 GPa, more preferably of at least 90 GPa, most preferably at least 120 GPa.

The tensile strength of the tape of the invention is preferably at least 1 GPa, more preferably at least 2 GPa, most preferably at least 3 GPa. The tensile modulus of the tape of the invention is preferably at least 60 GPa, more preferably at least 80 GPa, more preferably at least 100 GPa, most preferably at least 120 GPa.

Achieving such impressive mechanical properties for the tape of the invention came as a surprise for the inventors as it is known in the art that improving dimensional characteristics usually comes to the expense of mechanical properties.

It was further observed that the mechanical properties of the tape of the invention are similar with the mechanical properties of the fibers utilized to manufacture thereof. This came also as a surprise since hitherto the mechanical properties of tapes manufactured from polymeric fibers were usually much lower than those of the polymeric fibers. Preferably, the tensile strength of the tape of the invention is lower than the tensile strength of the polymeric fibers used to manufacture thereof with at most 20%, more preferably with at most 10%, most preferably with at most 5%. Preferably, the tensile modulus of the tape of the invention is lower than the tensile modulus of the polymeric fibers used to manufacture thereof with at most 20%, more preferably with at most 10%, most preferably with at most 5%. If a plurality of polymeric fibers with various tensile strengths and modulus are used to manufacture the tape of the invention, the tensile strength or modulus of the polymeric fibers to be considered are an average tensile strength and modulus of the various polymeric fibers.

The invention further relates to a process for the manufacturing of the tapes of the invention, comprising the steps of:

a) providing a plurality of polymeric fibers having a melting temperature $T_m$;

b) forming a layer comprising a network of polymeric fibers;

c) introducing the layer into a nip of a calendar and calendaring said layer with a calendaring line-pressure of at least 100 N/mm, at a temperature of below $T_m$ of the polymeric fibers to form a tape comprising fused polymeric fibers; and d) cooling the tape to preferably room temperature.

It was observed that with the process of the invention, a tape having reduced thickness variations as compared with known fibrous tapes may be obtained.

Preferably, at step a) of the process of the invention, the plurality of polymeric fibers is grouped together into at least one yarn, more preferably into a plurality of yarns that may be twisted or untwisted.

Polymeric fibers are characterized in general by a melting temperature $T_m$. The melting temperature may be determined as commonly known in the art by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only. In case a plurality of various polymeric fibers having different melting temperatures is used, by melting temperature is herein understood the highest of melting temperatures of the various polymeric fibers.

According to the process of the invention, at step b) the polymeric fibers are formed into a network of fibers. By network is herein meant fibers arranged in configurations of various types. For example, the plurality of polymeric fibers may be formed into a felt, knitted or woven, e.g. plain, basket, satin, crow feet, configuration; or into a non-woven configuration which may comprise random or ordered oriented fibers such as arranged in parallel arrays. Most preferred network of fibers is an unidirectional network wherein a majority of fibers, e.g. at least 50 mass %, more preferably at least 75 mass %, even more preferably at least 95 mass %, most preferably about 100 mass % of the total mass of fibers forming the network, is arranged to run substantially in parallel along a common direction.

The thickness of the layer comprising the network of polymeric fibers is preferably chosen to yield after the calendaring step d) the desired thickness of the tape.

Preferably, the process of the invention comprises an additional step b1) wherein the polymeric fibers are pre-heated below their $T_m$, before or after being used to form the layer comprising the network of fiber. Pre-heating of the polymeric fibers may be carried out by keeping the fibers for a dwell time in an oven set at a pre-heating temperature. Preferably, the pre-heating temperature is between $T_m$ and $T_m-15°$ C., more preferably between $T_m$ and $T_m$, $-10°$ C., most preferably between $T_m$ and $T_m-5°$ C. The dwell time is preferably between 2 and 100 seconds, more preferably between 5 and 60 seconds, most preferably between 10 and 30 seconds.

At step c) of the process of the invention, the layer comprising the network of polymeric fibers is introduced into the nip of a calendar for calendaring. Preferably, said layer is introduced into said nip with an inline speed of at least 1 m/min, more preferably of at least 2 m/min, most preferably of at least 3 m/min. Preferably the line pressure used for the calendaring, also referred to hereinbefore and after as the calendaring line pressure, is at least 100 N/mm, is more preferably at least 100 N/mm, even more preferably at least 300 N/mm, most preferably at least 500 N/mm. It was observed that the higher the line pressure is, the higher the degree of fusion of the tapes is. It is commonly known in the art that a calendar comprises at least two counter-rotating calendaring rolls which form a nip, e.g. where they abut each other, said nip being kept constant by applying a, preferably constant, closing force on said rolls. The closing force is usually measured by a force gauge. The calendaring line pressure can therefore be easily determined by dividing the closing force as measured by the force gauge to the width of the layer comprising the network of fibers.

The calendaring process is preferably carried out at a temperature below the $T_m$ of the polymeric fibers, more preferably between $T_m$ and $T_m-15°$ C., even more preferably between $T_m$ and $T_m-10°$ C., most preferably between $T_m$ and $T_m-5°$ C. The temperature at which the calendaring process is carried out may be set by using heated calendaring rolls. The skilled person can determine the temperature at which the calendaring process takes place by routine experimentation. Said temperature is influenced mainly by the diameter of the calendaring rolls, the temperature at which the polymeric fibers are preheated, if applicable, and the inline speed. Preferably, calendaring rolls are used having a diameter of between 100 mm and 1000 mm, more preferably between 200 mm and 700 mm, most preferably between 300 mm and 500 mm. The skilled person knows that the higher the temperature at which the calendaring rolls are heated and the greater the diameter of said calendaring rolls, higher inline speeds may be used.

In a preferred embodiment, the process of the invention comprises the steps of:

a) providing a plurality of polymeric fibers, preferably polyethylene fibers, more preferably UHMWPE fiber, said fibers having a melting temperature $T_m$;

b) unidirectionally aligning and spreading the plurality of polymeric fibers to form a layer of abutting and unidirectionally aligned polymeric fibers;

b1) pre-heating the polymeric fibers before and/or after carrying out step b) at a temperature of below $T_m$, preferably at a temperature of between 130° C. and 150° C., more preferably at a temperature of between 135° C. and 149° C., most preferably at a temperature of between 140° C. and 147° C.;

c) introducing the layer of abutting and unidirectionally aligned polymeric fibers into a nip of a calendar at an inline speed of at least 3 m/min and calendaring said layer with a calendaring line-pressure of at least 500 N/mm, at a temperature of below $T_m$, preferably at a temperature of between 140° C. and 150° C., more preferably at a temperature of between 145° C. and 149° C., to form a tape comprising fused polymeric fibers; and d) cooling the tape to preferably room temperature.

In the mentioned steps d) hereabove, the tapes are cooled such that the temperature of the tapes is reduced with at least 25° C., preferably the tapes are cooled to room temperature.

The unidirectional alignment of polymeric fibers may be achieved through various standard techniques known in the art that are able to produce substantially straight rows of unidirectionally aligned fibers, such that adjacent fibers overlap and preferably there is substantially no gap between them. An example of such a technique is described in WO 2009/0056286 included herein by reference, wherein a layer comprising abutting and unidirectionally aligned polymeric fibers may suitably be formed by feeding a polymer fiber from an unwinding station under tension, through an alignment means, e.g. a reed followed by a plurality of spreader bars.

The tension applied on the polymeric fibers is preferably no more than 50%, more preferably no more than 20% of the tensile strength of the polymeric fibers calculated at room temperature. In a preferred embodiment, the tension on the fibers before the calendar is at least 0.3 cN/dtex. Preferably the tension on the fibers before the calendar is at most 10.0 cN/dtex, more preferably the tension on the fibers before the calendar is at most 3.0 cN/dtex. In another preferred embodiment, the tension on the fibers after the calendar is at least 0.3 cN/dtex, more preferably at least 0.5 cN/dtex, and most preferably at least 0.7 cN/dtex. Preferably the tension on the fibers after the calendar is is at most 10.0 cN/dtex, more preferably at most 3.0 cN/dtex. In yet another preferred embodiment, the tension on the fibers before and the tension on the fibers after the calendar is at least 0.3 cN/dtex, and is at most 10.0 cN/dtex, more preferably at most 3.0 cN/dtex, whereby the tension on the fibers after the calendar is higher than the tension on the fibers before the calendar.

Preferably, the polymeric fibers used for obtaining the layer comprising abutting and unidirectionally aligned polymeric fibers, are grouped into a plurality of yarns, each yarn having a titer of preferably at least 220 dtex, more preferably at least 880 dtex, most preferably at least 1760 dtex. Preferably, said yarns have a titer of preferably at most 20000 dtex, more preferably at most 10000 dtex, most preferably at most 7000 dtex. Preferably, the yarns are spread with a reed count of at least 0.3 yarns/cm, more preferably at least 1.5 yarns/cm, most preferably at least 5 yarns/cm. Preferably, said reed count is at most 25 yarns/cm, more preferably at most 20 yarns/cm, most preferably at most 15 yarns/cm.

Preferably, the thickness of the layer comprising abutting and unidirectionally aligned polymeric fibers is at least 1.0, more preferably at least 1.3, most preferably at least 1.5 times the thickness of an individual polymeric fiber. If polymeric fibers with diferent thicknesses are used, by the thickness of an individual fiber is herein understood an average thickness of the utilized fibers. Preferably, the maximum thickness of said layer is no more than 20, more preferably no more than 10, even more preferably no more than 5 and most preferably no more than 3 times the thickness of an individual polymeric fiber.

Preferably, the process of the invention further comprises subsequent to the calendaring step c) and preferably before the cooling step d) a further drawing step c1) wherein the tape is drawn to a draw ratio of at least 1.1, more preferably of at least 1.5, most preferably of at least 1.8. It was observed that with the extra drawing step c1) fibrous tapes having further improved properties may be obtained.

In a preferred embodiment, the process of the invention comprises a second calendaring step c') carried out preferably under the same calendaring conditions of step c). If the process of the invention also comprises the further drawing step c1), step c') may be carried out before or after, preferably after, step c1). Also before carrying out step c') the fibrous tape may also be preheated, preferably at a pre-heating temperature of below the $T_m$ of the polymeric fibers. After the second calendaring step c'), the process of the invention may further comprise a further drawing step c'1) wherein the tape is drawn to a draw ratio of at least 1, more preferably of at least 2, most preferably of at least 3. It was observed that the process according to this embodiment of the invention provides fibrous tapes with yet further improved properties.

The process of the present invention furthermore enables tapes to be made that were never made available before, i.e. tapes with a unique combination of mechanical properties. More specifically the present invention enables UHMWPE tapes with a tensile strength and a tensile strength/tensile modulus ratio of at least 2.6 GPa and at most $3.25*10^{-2}$, respectively. More preferably these new tapes have a tensile strength and a tensile strength/tensile modulus ratio of at least 2.7 GPa and at most $2.5*10^{-2}$, and most preferably these new tapes have a tensile strength and a tensile strength/tensile modulus ratio of at least 2.9 GPa and at most $2.2*10^{-2}$. Such tapes yield excellent performance when used in the manufacture of antiballistic products. Such high performance is unexpected in the field of antiballistic products. According to Cunnif's theory, which is generally applied and referred to in the development of antiballistic products, a good antiballistic performance, requires a high strength combined with a low modulus; or for a constant strength dictates that better performance is obtained when the modulus is low. The new tapes of the present invention do not obey this principle and yet show surprisingly high antiballistic performance.

The invention further relates to products comprising the fibrous tapes of the invention. In particular, the invention relates to a panel comprising a stack of two or more sheets comprising monolayers containing the fibrous tapes of the invention, preferably said monolayers comprising a fabric containing said tapes, preferably said monolayers containing unidirectionally aligned fibrous tapes, more preferably said monolayers containing a fabric woven from fibrous tapes. The monolayers may also contain a binder. The purpose of the binder may be to hold said fibrous tapes in place in order to improve the ease of operation of the monolayers or sheets comprising thereof. Suitable binders are described in e.g. EP 0191306 B1, EP 1170925 A1, EP 0683374 B1 and EP 1144740 A1. It was observed that good results may be obtained when the monolayers or the sheets or the panel is free of any binder or any other material the purpose of which being to hold the fibrous tapes together.

Mechanical fusing is preferably achieved under a combination of pressure, temperature and time which results in substantially no melt bonding. Preferably, there is no detectable melt bonding as detected by DSC (10° C./min). No detectable melt bonding means that no visible endothermic effect consistent with partially melt recrystallized fibers is detected, when the sample is analyzed in triplicate. It has been found the application of high pressures at a temperature suitably below the melting point of the fiber results in no detectable amount of melt recrystallized fibers being present, which is consistent with the substantial absence of melt bonding.

By a monolayer containing unidirectionally aligned fibrous tapes is herein understood that a majority of the fibrous tapes in the monolayer, e.g. at least 70 mass % of the total mass of fibrous tapes in said monolayer, more preferably at least 90 mass %, most preferably about 100 mass %, run along a common direction. Preferably, the direction of the fibrous tapes in a monolayer is at an angle α to the fiber direction in an adjacent monolayer, whereby α is preferably between 5 and 90°, more preferably between 45 and 90° and most preferably between 75 and 90°.

Preferably, the panel of the invention is compressed at a temperature of below the Tm of the polymeric fibers, more preferably at a temperature of between said Tm and Tm −30° C. and with a pressure of at least 100 bars, more preferably at least 150 bars, to obtain a rigid panel.

The invention further relates to an armor comprising the panel of the invention. Examples of armors include but are not limited to helmets, breast plates, vehicle hulls and vehicle doors.

The present invention further relates to a product for automotive applications (car parts, etc.), marine applications (ships, boats, panels, etc.), aerospace applications (planes, helicopters, panels, etc.), defense/life-protection applications (ballistic protection, body armor, ballistic vests, shields, ballistic helmets, ballistic vehicle protection, etc.), architectural applications (windows, doors, (pseudo-)walls, cargo doors, cargo walls, radomes, shields, etc.), wherein said product contains the tapes or the panel of the invention.

The invention will be further explained with the help of the following examples without however being limited thereto.

METHODS OF MEASURING

Flexural strength of a panel is measured according to ASTM D790-07. To adapt for various thicknesses of the panel, measurements are performed according to paragraph 7.3 of ASTM D790-07 by adopting a loading and a support nose radius which are twice the thickness of the article and a span-to-depth ratio of 32.

Areal density (AD) was determined by measuring the weight of a sample of preferably 0.4 m×0.4 m with an error of 0.1 g.

Intrinsic Viscosity (IV) for polyethylene is determined according to method PTC-179 (Hercules Inc. Rev. Apr. 29, 1982), or alternatively ASTM D-1601, at 135° C. in decalin, the dissolution time being 16 hours, with DBPC as antioxidant in an amount of 2 g/l solution, by extrapolating the viscosity as measured at different concentrations to zero concentration.

Side chains in a polyethylene or UHMWPE sample is determined by FTIR on a 2 mm thick compression molded film by quantifying the absorption at 1375 cm-1 using a calibration curve based on NMR measurements (as in e.g. EP 0 269 151)

Tensile properties, i.e. strength and modulus, of fibers were determined on multifilament yarns as specified in ASTM D885M, using a nominal gauge length of the fiber of 500 mm, a crosshead speed of 50%/min and Instron 2714 clamps, of type Fiber Grip D5618C. For calculation of the strength, the tensile forces measured are divided by the titer, as determined by weighing 10 meters of fiber; values in GPa for are calculated assuming the natural density of the polymer, e.g. for UHMWPE is 0.97 g/cm3.

The tensile properties of tapes: tensile strength, tensile modulus and elongation at break are defined and determined at 25° C. on tapes of a width of 2 mm as specified in ASTM D882, using a nominal gauge length of the tape of 440 mm, a crosshead speed of 50 mm/min.

The melting temperature (also referred to as melting point) of a polymeric fiber or fibrous tape is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only. The furnace block of the DSC-7 is cooled with water, with a temperature of 4° C. This is done to provide a constant block temperature, resulting in more stable baselines and better sample temperature stability. The temperature of the furnace block should be stable for at least one hour before the start of the first analysis.

The sample is taken such that a representative cross-sectional of adjoining peripheral fiber surfaces of adjacent fibers is achieved which may suitable be seen through light microscopy. The sample is cut into small pieces of 5 mm maximum width and length to achieve a sample weight of at least about 1 mg (+/−0.1 mg).

The sample is put into an aluminum DSC sample pan (50 µl), which is covered with an aluminum lid (round side up) and then sealed. In the sample pan (or in the lid) a small hole must be perforated to avoid pressure build-up (leading to pan deformation and therefore worse thermal contact).

This sample pan is placed in a calibrated DSC-7 instrument. In the reference furnace an empty sample pan (covered with lid and sealed) is placed.

The following temperature program is run:

5 min. 40° C. (stabilization period) 40 up to 200° C. with 10° C./min. (first heating curve) 5 min. 200° C. 200 down to 40° C. (cooling curve) 5 min. 40° C. 40 up to 200° C. with 10° C./min. (second heating curve)

The same temperature program is run with an empty pan in the sample side of the DSC furnace (empty pan measurement).

Analysis of the first heating curve is used. The empty pan measurement is subtracted from the sample curve to correct for baseline curvature. Correction of the slope of the sample curve is performed by aligning the baseline at the flat part before and after the peaks (e.g. at 60 and 190° C. for UHMWPE). The peak height is the distance from the baseline to the top of the peak. For example in the case of UHMWPE, two endothermic peaks are expected for the first heating curve, in which case the peak heights of the two peaks are measured and the ratio of the peak heights determined. It should be noted that in case the polymeric fibers are under restraint conditions, their melting temperature might increase. This is the case for example when load is applied on said fibers. To determine the melting temperature of polymeric fibers under restraint conditions, the fibers were hand winded on an aluminum rod having 2 mm diameter.

For the calculation of the enthalpy of an endothermic peak transition prior to the main melting peak, the following procedure may be used. It is assumed that the endothermic effect is superimposed on the main melting peak. The sigmoidal baseline is chosen to follow the curve of the main melting peak, the baseline is calculated by the PerkinElmer Pyris™ software by drawing tangents from the left and right limits of the peak transition. The calculated enthalpy is the peak area between the small endothermic peak transition and the sigmoidal baseline. To correlate the enthalpy to a weight %, a calibration curve may be used.

The coefficient of variation of the thickness of a tape across the width of the tape was determined by measuring the thickness of the tape using a cross-section of the tape. The cross-section of the tape was obtained by embedding a tape in epoxy resin and cutting slices of the embedded tape-resin system. At least 5 locations, evenly distributed, across the width of the tape were used to measure a local thickness corresponding to each of these locations. Such thickness measurement may suitably be performed with a microscope whereby an enlargement is chosen such that the width of a tape is equal to about 40 times the thickness of the tape. The 5 measurements are taken along this width of the tape. The so obtained at least 5 values were averaged and the standard deviation was computed. The coefficient of variation expressed in % was calculated by dividing the standard deviation by the averaged value. The CV may be determined on pressed panels, in the event that only such are available. Sample pretreatment is the same as mentioned above. In the event that individual tapes are only visible as layers than such layer is treated as a tape as mentioned above and the 5 measurements are performed on such layer. CV measurements are done on 5 tapes (or layers) throughout the cross section of the panel at regular intervals and the average result of such 5 layers is reported as the CV.

Tensile modulus of binders and matrix materials was measured according to

ASTM D-638(84) at 25° C.

Back face deformation was tested according to NIJ 0101.04 level IIIA using 20 mm FSP on an internal shooting template.

Ballistic performance was measured by subjecting the armor to shooting tests performed with standard (STANAG) 17 mm FSP and 9 mm Parabellum. The first shot was fired at a projectile speed (V50) at which it is anticipated that 50% of the shots would be stopped. The actual bullet speed was measured at a short distance before impact. If a stop was obtained, the next shot was fired at an anticipated speed being 10% higher than the previous speed. If a perforation occurred, the next shot was fired at a speed 10% lower than the previous speed. The result for the experimentally obtained V50 value was the average of the two highest stops and the two lowest perforations. The kinetic energy of the bullet at V50 was divided by the total areal density of the armor to obtain a so-called Eabs value. Eabs reflects the stopping power of the armor relative to its weight/thickness thereof. The higher the Eabs the better the armor is.

The speed of the projectile was measured with a pair of Drello Infrared (IR) light screen Type LS19i3 positioned perpendicular on the path of the projectile. At the instant when a projectile passes through the first light screen a first electric pulse will be produced due to the disturbance of the IR beam. A second electric pulse will be produced when the projectile passes through the second light screen. Recording the moments in time when the first and the second electric pulses occur, and knowing the distance between the light screed the speed of the projectile can be immediately determined.

EXAMPLES AND COMPARATIVE EXPERIMENT

Example 1

A number of 40 yarns having a titer of about 1760 dtex and comprising UHMWPE fibers were spread with a reed count of 30 yarns/10 cm, to create a layer of unidirectionally aligned and overlapping UHMWPE fibers, said layer having a thickness of about 100 µm. The tension on the yarns during spreading was 280 cN. The yarns are commercially available being sold by DSM Dyneema as Dyneema® S K76.

The fibers in the layer were pre-heated with an infrared lamp to a temperature of 145° C. and the layer with the pre-heated fibers was introduced into the nip of a calendar consisting of two counter-rotating rolls, each having a diameter of 400 mm and a length of 800 mm. Both rolls rotated at a speed of 3 m/min. Both rolls were heated to 156° C.

The nip was 800 mm wide and had a height of about 50 µm and a constant line pressure of about 500 N/mm was applied on the layer. During the calendaring process the fibers in the layer were fused together to produce a tape 120 mm wide. The tape was then cooled to room temperature (about 22° C.). The properties of the obtained tape are presented in Table 1.

Example 2

Example 1 was repeated with the addition that immediately after the calandering step, thus before cooling the tape, the tape was introduced into an oven set at a temperature of 153° C. and drawn with a draw ratio of about 1.1. The tape was then cooled to room temperature (about 22° C.). The properties of the obtained tape are presented in Table 1.

Example 3

Example 1 was repeated with the addition that the obtained tape was pre-heated again at a temperature of 145° C. and was calendared again under the same condition as those in Example 1. After being calendared, the tape was introduced into an oven set at a temperature of 153° C. and drawn with a draw ratio of about 1.2. The tape was then cooled to room temperature (about 22° C.). The thickness of each individual tape was about 45 µm. The properties of the obtained tape are presented in Table 1.

COMPARATIVE EXPERIMENT A

At least one example of WO 2009/0056286 was repeated. That sample was made by winding a high strength polyethylene fiber with a tenacity of 35.3 cN/dtex and a filament thickness of about 19 micron, guided over 10 spreader bars, around an aluminum receiving plate. Fibers were wound around the plate to obtain a first fiber layer with a targeted thickness of the wound layer of about 30 µm. The fibers in the fiber layer were wound such that the fibers were at least partially overlapping or abutting. After one fiber layer was formed, the receiving plate was rotated and a new fiber layer was created by winding fiber around the receiving plate with the first fiber layer. The receiving plate was rotated such that the orientation of the fibers in the second layer were at an angle of 90° to the fiber direction in the first fiber layer. In total 114 layers of fibers were created, the fiber direction in each layer at an angle of 90° to an adjacent fiber layer. The so obtained receiving plate with fiber layers was pressed at 300 bar and 138° C. during 1 hour and cooled to 80° C. The pressed fiber layers were separated from the receiving plate as mentioned in the examples of WO 2009/0056286. The obtained pressed product was weighed and had an areal density of 2.6 kg/m2. This means an average thickness of each of the fiber layers in the pressed product of 23 µm. The CV was at 5 individual layers throughout the thickness of the sample. The average CV measured on these 5 layers was 22.7.

The results are presented in Table 1.

TABLE 1

|  | Thickness (µm) | CV % | Tensile strength (GPa) | Tensile Modulus (GPa) |
|---|---|---|---|---|
| Exp. 1 | 47 | 2.2 | 2.5 | 60 |
| Exp. 2 | 46 | 2.3 | 2.7 | 120 |
| Exp. 3 | 45 | 2.2 | 2.9 | 132 |
| Comp. Exp. 1 | 23 | 22.7 |  |  |

Example 4

A monolayer was formed from a number of 10 tapes obtained according to Example 3, which were aligned in parallel in a unidirectional manner, such that two adjacent tapes abutted each other but did not overlap. Care was taken to minimize the gaps between the tapes.

A number of 63 monolayers were stacked in a cross-plied manner, i.e. the direction of tapes' alignment in two adjacent monolayer being under a 90° angle. The stack of monolayers was compressed at a pressure of 300 bars and at a temperature of about 145° C. for 30 minutes after which it was cooled under pressure to room temperature to obtain a rigid panel. The properties of the obtained panel are presented in Table 2.

Example 5

In the same way as in Example 4, a rigid panel was made from the tapes obtained according to Example 1. The properties are presented in Table 2.

COMPARATIVE EXPERIMENT A

The panel from comparative experiment A, as manufactured in accordance with the examples of WO 2009/0056286 was tested on ballistic performance. The results are presented in Table 2.

TABLE 2

|  | Areal density (kg/m²) | Eabs 9 mm Parabellum (Jm²/kg) | Eabs 17 mm FSP (Jm²/kg) |
|---|---|---|---|
| Exp. 4 | 2.6 | 347 | 56 |
| Exp. 5 | 2.7 |  | 35 |
| Comp. Exp. A | 2.6 | 279 | 26 |

The invention claimed is:

1. A fibrous tape comprising fused polymeric fibers, wherein at least 75 mass % of the fused polymeric fibers are oriented so as to be substantially in parallel along a common direction, and wherein
   the polymeric fibers have a fiber length and abutting ones of the polymeric fibers are fused to each other over an abutting length of at least 50% of the fiber length, and wherein
   the fibrous tape has a tape thickness from 1 µm to 200 µm, a tape width, and a coefficient of variation (CV) of the tape thickness across the tape width of at most 6%, wherein the CV of the tape thickness is calculated by:
      (i) obtaining a cross section of the tape by embedding the tape in epoxy resin and cutting slices of the embedded tape-resin system;

(ii) selecting an enlargement using a microscope such that the width of the tape is equal to about 40 times the thickness of the tape;
(iii) taking 5 measurements of the local thickness of the tape, evenly distributed across the width of the tape; and
(iv) dividing the standard deviation of the 5 measurements by the average of the 5 measurements.

2. The tape of claim 1, wherein the CV of the tape thickness across the tape width is at most 3%.

3. The tape of claim 1, wherein the ratio of width to thickness of the tape is at least 5:1.

4. The tape of claim 1, wherein the width of the tape is between 1 mm and 2000 mm.

5. The tape of claim 1, wherein the polymeric fibers are polyolefin fibers.

6. The tape of claim 5, wherein the polyolefin fibers are polyethylene fibers.

7. The tape of claim 5, wherein the polyolefin fibers are ultrahigh molecular weight polyethylene ([U]HMWPE) fibers.

8. The tape of claim 1, wherein the tensile strength of the polymeric fibers is at least 1.2 GPa.

9. The tape of claim 1, wherein the tensile modulus of the polymeric fibers is at least 5 GPa.

10. The tape of claim 1, wherein the tape has a tensile strength of at least 1 GPa.

11. The tape of claim 1, wherein the tape has a tensile modulus of at least 60 GPa.

12. A panel comprising a stack of two or more sheets comprising monolayers which include a fibrous tape of claim 1.

13. A product comprising a fibrous tape of claim 1, wherein the product is selected from the group consisting of automotive products, marine products, aerospace products, life-protection products and architectural products.

14. The product according to claim 13, wherein the product is a product for ships, boats, marine panels, planes, helicopters, aerospace panels, body armor, ballistic vests, ballistic shields, ballistic helmets, ballistic vehicle protection, windows, doors, walls, cargo doors, cargo walls, radomes and shields.

15. A process for the manufacturing of a tape according to claim 1, comprising the steps of:
(a) providing a plurality of polymeric fibers having a melting temperature Tm;
(b) forming a layer comprising a network of polymeric fibers;
(c) introducing the layer into a nip of a calendar and calendaring the layer with a calendaring line-pressure of at least 100 N/mm, at a temperature of below Tm of the polymeric fibers to form a tape comprising fused polymeric fibers; and
(d) cooling the tape.

16. The process of claim 15, wherein step (d) includes cooling the tape to room temperature.

17. The process according to claim 15, wherein the plurality of polymeric fibers are in the form of an ordered parallel array.

18. The process according to claim 15, wherein step (b) comprises forming the layer comprising an abutting and unidirectionally aligned network of the polymeric fibers.

19. The process according to claim 18, wherein the polymeric fibers forming the abutting and unidirectionally aligned network of the layer are grouped into a plurality of yarns, each yarn having a titer of at least 220 dtex.

* * * * *